United States Patent [19]
Matsuno et al.
[11] Patent Number: 4,739,341
[45] Date of Patent: Apr. 19, 1988

[54] HEAT SENSITIVE TRANSFER RECORDING APPARATUS AND METHOD

[75] Inventors: Jyunichi Matsuno, Toride; Masashi Yoshida, Nakaminato, both of Japan
[73] Assignee: Hitachi, Ltd., Tokyo, Japan

[21] Appl. No.: 875,223
[22] Filed: Jun. 17, 1986
[30] Foreign Application Priority Data
Jun. 19, 1985 [JP] Japan .............................. 60-131710
[51] Int. Cl.⁴ .......................... G01D 15/10; B41J 3/20
[52] U.S. Cl. ................................ 346/1.1; 346/76 PH; 400/120
[58] Field of Search ........................... 346/76 PH, 1.1; 400/120

[56] References Cited

U.S. PATENT DOCUMENTS

| | | | |
|---|---|---|---|
| 4,507,666 | 3/1985 | Kondo et al. | 346/76 PH |
| 4,507,667 | 3/1985 | Tsuboi | 346/76 PH |
| 4,532,524 | 7/1985 | Yana et al. | 346/76 PH |
| 4,551,729 | 11/1985 | Kubo et al. | 346/1.1 |

*Primary Examiner*—Clifford C. Shaw
*Assistant Examiner*—Gerald E. Preston
*Attorney, Agent, or Firm*—Antonelli, Terry & Wands

[57] ABSTRACT

A heat sensitive transfer recording apparatus comprising a carrier such as a transfer film to which applied is a transfer material that may be heat transferred, a thermal head having a number of heater elements each producing heat in accordance with an image signal, and a platen roller rotatable in a forward direction or in a reverse direction. The carrier and a recording medium, such as a recording paper overlapped on the carrier, are delivered in the forward direction by the platen roller while being pressed by the thermal head, whereupon the image recording is carried out. Also, in case of multicolor overlap recording, the recording medium is delivered in the reverse direction under a pressure release condition of the thermal head by an assistant roller provided on a recording medium pay-out side with respect to the transfer position defined between the platen roller and the thermal head.

9 Claims, 3 Drawing Sheets

HEAT SENSITIVE TRANSFER RECORDING APPARATUS AND METHOD

BACKGROUND OF THE INVENTION

1. Field of the Invention

The present invention relates to a heat transfer recording apparatus for carrying out a recording by heat-transferring a heat transfer material of a carrier onto a recording medium cut in a predetermined size, and more particularly to a heat sensitive transfer recording apparatus and method for a transfer recording in which a plurality of colors are overlapped one on another on a recording medium.

2. Description of the Prior Art

As shown in, for example, U.S. Pat. No. 4,463,360, a prior art heat transfer recording apparatus, more particularly heat transfer color recording apparatus, is constructed so that a carrier, i.e., transfer film and a recording medium, i.e., paper cut in a predetermined size are overlapped together and may be delivered while being pressed between a thermal head and a platen roller. In one delivery operational mode, either the recording paper or transfer film only is delivered. Such a delivery mode is needed for identifying the color of the transfer film or reversely feeding the recording paper.

In principle, this operation may be carried out with the thermal head and the platen roller only by suitably selecting frictional coefficients between the transfer film and the recording paper and between the recording paper and the platen roller. However, as a matter of fact, an additional delivery means is needed since a reliability is degraded due to a static electrocity or a change of the frictional coefficients.

In such a recording method that recording papers cut in a predetermined size are delivered in a forward direction or a reverse direction, and then the overlap recording is carried out, the following difficulties should be taken into consideration in case of the provision of the above-described additional delivery means.

Namely, in case of the delivery of the recording paper in the reverse direction, the delivery force would be insufficient due to the frictional force between the recording paper and the carrier or the load caused by the static electricity, resulting in reduction of overlap precision and causing a paper jam due to a deficiency of the recording paper rigidity. A parallelism between a contact line defined by the additional delivery means and the platen roller and another contact line defined between the thermal head and the platen roller is the most important factor in preventing the recording paper from travelling in an inclined manner, thus requiring a super high accuracy in manufacturing and assembling the apparatus. Furthermore, in the case where an angle defined between the delivery direction of the recording paper and the delivery direction of the transfer film is small, when the recording paper is separated apart from the transfer film after the thermal transfer, there is a fear that the transferred ink would fall or that an separation noise would be made.

SUMMARY OF THE INVENTION

An object of the present invention is to provide a heat sensitive transfer recording apparatus and method in which a precision in overlap recording position between a carrier and a recording medium may be always ensured in a stabilized manner, and a separation between the carrier and the recording medium after the thermal transfer may be stabilized.

According to the present invention, in a heat sensitive transfer recording apparatus including a thermal heat having heater elements each producing a heat in response to an image signal, a carrier to which applied is a thermal transfer material that may be heat-transferred, and a platen roller for delivering the carrier and a recording medium, overlapped on the carrier and subjected to the transfer material from the carrier, while pressing the carrier and the recording medium against the thermal head, wherein the recording medium is delivered in a forward direction and in a reverse direction, thereby carrying out an overlap recording, there is provided a heat transfer recording apparatus comprising a first assistant roller for pressing against the platen roller only the recording medium independently of the carrier delivered by the platen roller, the first assistant roller being provided in a pay-out side of the recording medium with respect to the transfer position, and a second assistant roller for pressing the carrier and the recording medium, overlapped on the carrier, against the platen roller and for releasing the pressure of the carrier and the recording medium, the second assistant roller being provided on an opposite side to the first assistant roller with respect to the transfer position.

In general, a heat transfer recording apparatus is constructed so that the recording medium or the carrier is independently delivered independently due to differences in frictional force between the carrier and the thermal head, between the carrier and the recording medium and between the recording medium and the platen roller, or both the recording medium and the carrier are pressingly clamped between the thermal head and the platen roller, thus performing the recording.

In such a conventional recording apparatus, since a friction between the recording medium and the platen roller decreases due to a change of circumstances, an increase of the delivery force between the platen roller and the recording medium in case of delivering only the recording medium in the reverse direction should be taken into particular consideration.

According to the present invention, the first assistant roller is provided in the pay-out side of the recording medium with respect to the transfer position, so that, when the recording medium is solely delivered in the reverse direction under the release condition of the pressure of the thermal head, the recording medium is delivered while being subjected to a suitable tension. Accordingly, even if the thermal head is separated away from the platen roller, a jamming of the recording paper having a low rigidity is avoided by frictional loads generated between the recording medium and the carrier and between the recording medium and a recording medium guide member.

Also, according to the invention, a second assistant roller, independent of the first assistant roller is provided opposite to the first assistant roller with respect to the transfer position, whereby, in the overlap recording, the separation between the carrier and the recording medium, after the transfer process is stabilized and when only the recording medium is delivered in the reverse direction, the carrier to which the tension is applied is wrapped around the platen roller at a predetermined wrap angle, thus performing the reverse delivery of the recording medium.

With such an arrangement, the delivery force of the recording medium is increased, and even if a parallelism between a contact line defined between the thermal head and the platen roller and a contact line the assistant roller that delivers only the recording medium and the platen roller is insufficient, the reverse delivery opposite to the forward delivery may be performed with a small inclination of the recording medium, thus carrying out a high positional accuracy recording in a stable manner.

DETAILED DESCRIPTION OF THE PREFERRED EMBODIMENTS

Figure 1:
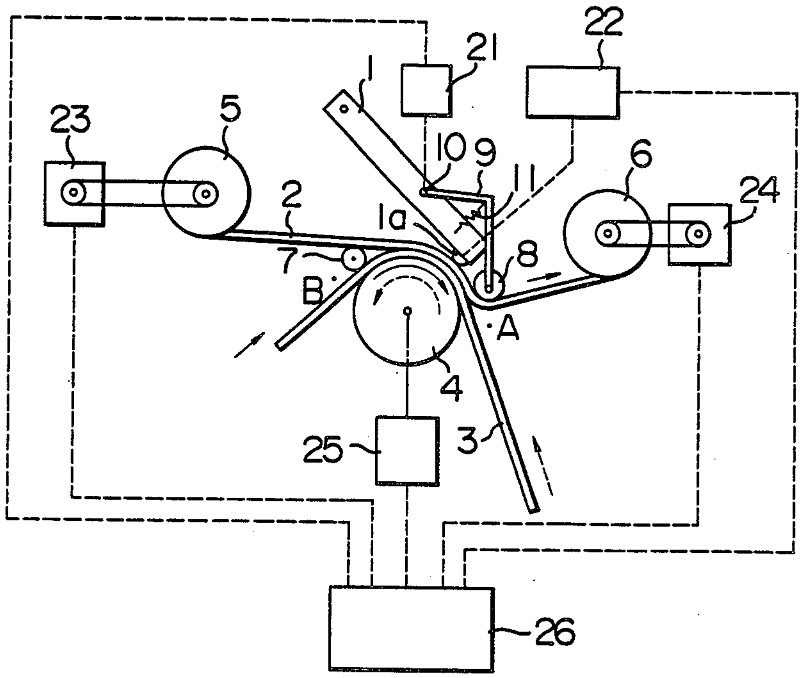
FIG. 1 is a schematic view of a portion of a heat sensitive transfer recording apparatus in accordance with one embodiment of the invention.

Referring now to the drawings wherein like reference numerals are used throughout the various views to designate like parts and, more particularly, to FIGS. 1 to 4, according to these figures, a thermal head 1, rotatably supported about a fulcrum to a housing (not shown), is provided with heater elements 1*a* each of which generates heat in response to an image signal. The thermal head 1 is drivingly rotated by a drive source 21 such as an electric drive actuator, and each heater element 1*a* is controlled to generate a heat by means of a drive control circuit 22. A carrier, i.e., transfer film 2 is made of a material having a high heat resistance such as a polyester film and a condenser paper and has a thickness of about 3–15 μm. A thermal transfer material such as a heat fusible material which may be transferred by heat or a sublimation dyestuff which may be sublimated by heat is applied on the transfer film 2. The transfer film 2 is provided at a transfer position between the thermal head 1 and a platen roller 4 and may be delivered between a pay-out reel 5 and a take-up reel 6 at a constant tension. In order to produce the tension, the pay-out reel 5 and the take-up reel 6 are connected to drive sources 23 and 24 having tension producing means, respectively. A recording medium, i.e., recording paper 3, is subjected to the transfer material through an overlap recording process with the transfer film 2. The recording paper 3 is fed from the pay-out reel 5 side to the platen roller 4 by delivery means (not shown). The platen roller 4 is coupled to a drive source 25 such as, for example, a DC motor which may be rotated in the forward direction and the reverse direction, so that the above-described transfer film 2 and recording paper 3 may be delivered in the forward direction while being pressingly clamped between the platen roller 4 and the thermal head 1 or only the recording paper 3 is fed reversely while being free from the clamping force between the thermal head and the platen roller. The above-described drive sources 21, 23, 24 and 25 and the drive control circuit 22 are controlled in series by a controller 26.

A first assistant roller 7 is disposed so as to press the recording paper 3 solely on the reverse delivery side (on the recording paper pay-out side) from the transfer position and is formed of a metal or a synthetic resin. A second assistant roller 8 is disposed so as to press the overlapped transfer film 2 and recording paper 3 on the forward delivery side (on the opposite side to the first assistant roller 7) from the transfer position, and is formed of a metal or a synthetic resin. The second assistant roller 8 is rotatably supported to a distal end portion of an arm 9 which is resiliently supported about a pivot pin 10 to the thermal head 1 by a tension spring 11, for example. Since the arm 9 is supported so that a pressing force is exerted at all times toward the platen roller 4 by the tension spring 11, the second assistant roller 8 is normally pressed toward the platen roller 4 irrespective of the pressing state and the free state of the thermal head 1.

The operation of the respective components shown in FIG. 1 will now be described in more detail.

When a transfer energy is inputted into the heater element 1*a* of the thermal head 1 in response to an image signal of a desired write/image recording through the drive control circuit 22, the heater element 1*a* produces a heat corresponding thereto, so that the transfer material of the transfer film 1 which is positioned corresponding to the heater element may be transferred.

In recording, the thermal head 1 presses the platen roller 4 to cause the transfer film 2 to be brought into pressing contact with the recording paper 3 wrapped around the platen roller 4 about the transfer position at a predetermined wrap angle.

Under such a condition, the image signal is fed to the thermal head 1 in response to the desired literal and/or pictorial information. In synchronism with this, the transfer film 2 is delivered in the direction indicated by the arrow and the platen roller 4 is rotated in the forward direction. Thus, the transfer material on the transfer film 2 may be transferred, thereby carrying out the transfer onto the recording paper 3.

In case of recording a color pictorial/literal information, a transfer film 2 is used in which respective colors such as yellow, magenta and cyan that are transfer material transferrable by heat are arranged in order in an equidistant manner in regions having a constant length. Also, the regions to which the transfer materials are applied correspond to an image recording frame size of the cut paper 3. Whenever the platen roller 4 starts to rotate, a leading end of the recording image frame and a leading end of each color of yellow, magenta and cyan are aligned in order. Thus, each color of yellow, magenta and cyan is overlapped one on another in order on the recording paper 3 whenever the recording paper 3 is reciprocatingly moved. The transfer process is carried out to record the color pictorial/literal information.

Figure 2:
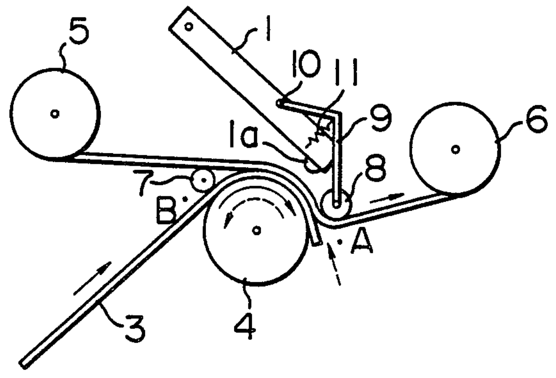
FIGS. 2 and 3 are views illustrating one example of operation of the apparatus shown in FIG. 1.
Figure 3:
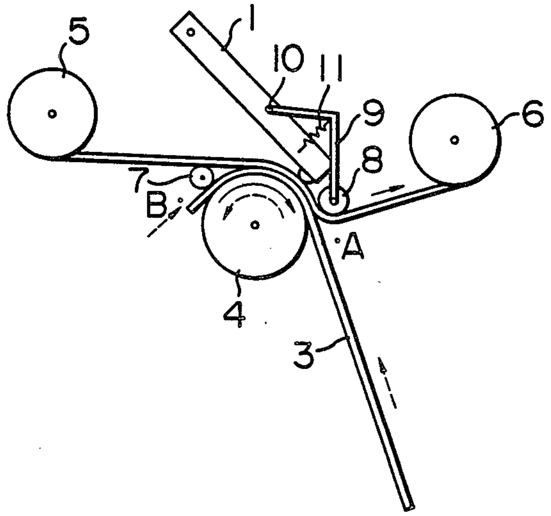
Figure 4:
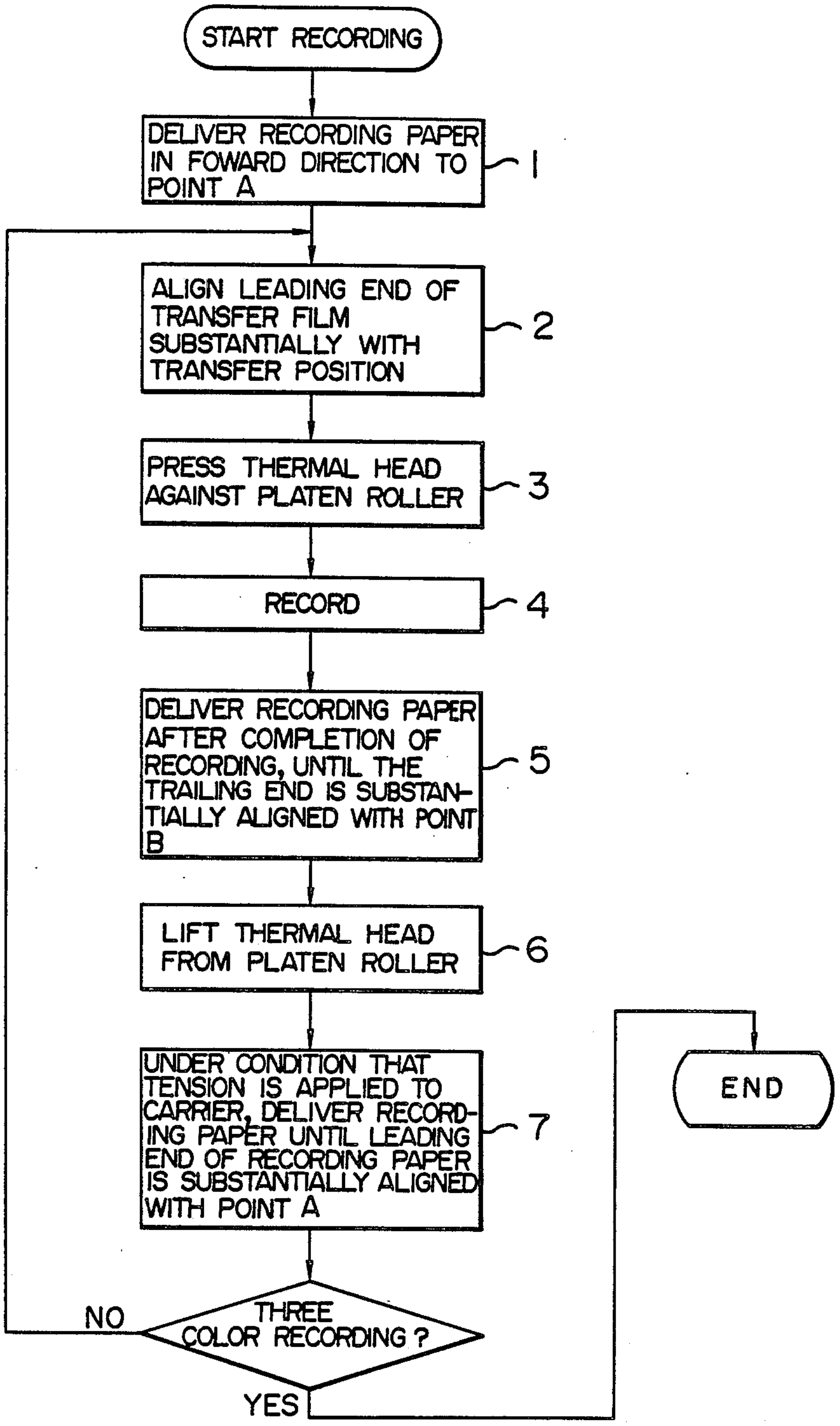
FIG. 4 is a flowchart showing the transfer operation of the apparatus shown in FIG. 1.

Referring to FIGS. 2, 3 and 4, an explanation will be made as to the color transfer recording operation in which the respective colors of yellow, magenta and cyan are overlapped in order, thereby carrying out the transfer process. First of all, the thermal head 1 is rotated about its fulcrum in the counterclockwise direction, thus releasing the pressure state against the platen roller 4. Under such a condition, the recording paper 3 is fed in the direction, indicated by the solid arrow, between the platen roller 4 and the first assistant roller 7 by the delivery means (not shown). At this time, the transfer film 2 is not pressed against the platen roller but is subjected to a tension between the pay-out reel 5 and the take-up reel 6 by the second assistant roller 8. Consequently, the leading end of the recording paper 3 is guided by the transfer film 2 after it has passed through the first assistant roller 7, and the leading end passes through the second assistant roller 8 to reach a position A shown in FIG. 2 (step (1) in FIG. 4). When the leading end of the recording paper 3 reaches the position A, the forward end of the region of the color of the transfer film 2 (in this case, the first color, i.e., yellow) is aligned with the transfer position (step (2) in FIG. 4).

Subsequently, the thermal head 1 is rotated about its fulcrum in the clockwise direction, so that the thermal head 1 is pressed against the platen roller 4 (step (3) in FIG. 4). Then, an image signal that corresponds to the first color, i.e., yellow is applied to the thermal head 1 by the control means (not shown), and in synchronism with this, the platen roller 4 is rotated in the forward direction. As a result, the overlapped transfer film 2 and recording paper 3 are delivered in the forward direction, thus performing the transfer recording (step (4) in FIG. 4). Upon the completion of the recording of the first color, i.e., yellow, the recording paper 3 is delivered until the trailing end thereof is positioned at a position B as shown in FIG. 3 (step (5) in FIG. 4).

When the recording of the first color, i.e., yellow is completed, the thermal head 1 is rotated in the counterclockwise direction, thus releasing the pressure state of the thermal head 1 (step (6) in FIG. 4). At this time, the second assistant roller 8 presses the transfer film 2 and the recording paper 3 against the platen roller 4 by the action of the spring 11. Under such a condition, the platen roller 4 is rotated in the reverse direction, only the recording paper 3 is delivered in the reverse direction indicated by the dotted arrow. The recording paper 3 is delivered until the leading end thereof reaches the position A (step (7) in FIG. 4). This condition is the record start condition of the first color, i.e., yellow, explained before, that is, the same condition as shown in FIG. 2 but the transfer material application region of the transfer film 2 corresponding to the recording paper 3 exhibits a second color, i.e., magenta instead of the first color, i.e., yellow.

The subsequent operation is repeated similarly to the recording of the first color, i.e., yellow, in order to perform the recording of the second color, i.e., magenta and the third color, i.e., cyan.

In the above-described transfer recording, the detection of the feed amount of the recording paper 3 in the forward direction and in the reverse direction is carried out by an angular rotation detector connected to the platen roller 4 or by an angular rotation detector connected to the drive source of the platen roller 4. However, another position detector may be used for detecting the end of the recording paper 3 at the positions A and B.

According to the foregoing embodiment, since the delivery force between the platen roller 4 and the recording paper 3 is increased, a highly accurate delivery may be attained without any slippage between the recording paper and the platen roller and any jamming of the recording paper.

Also, even if the parallelism between the contact line defined by the thermal head 1 and the platen roller 4 and the contact line defined between the platen roller 4 and the first assistant roller 7 for solely delivering the recording paper 3 is not in high order, it is possible to carry out the delivery of the recording paper 3 in the forward and reverse directions with a small inclination of the recording paper. In addition, since a very high accuracy is not needed for the mounting position of the assistant rollers, it is possible to reduce the overall cost.

Furthermore, according to the foregoing embodiment, since the angle defined between the delivery direction of the recording paper 3 and the delivery direction of the transfer film 2 may be suitably selected when the transfer film is separated from the recording paper 3 after the transfer process, there is no fear that the transferred ink would fall apart upon the separation, or a separation noise would occur.

As described above, according to the present invention, the overlap recording positional precision between the carrier and the recording medium may be ensured in a stable manner at all times, thus providing a highly accurate delivery. Moreover, the separation between the carrier and the recording medium, after the transfer process, may be stabilized.

What is claimed is:

1. In a heat sensitive transfer recording apparatus including a thermal head having heater elements each producing heat in response to an image signal, a drive control means for drivingly controlling said thermal head, a carrier to which is applied a thermal transfer material that may be heat transferred, and a platen roller means for delivering in a forward direction said carrier and a recording medium cut in a predetermined size, so as to have a leading end and a trailing end, and overlapped on said carrier, and for delivering only the cut recording medium in a reverse direction, wherein, upon delivering in the forward direction said carrier and the recording medium overlapped on said carrier, said thermal head is actuated, thereby transferring said thermal transfer material of said carrier to said recording medium at a transfer position, an improvement comprising a first assistant roller means arranged for pressing only said cut recording medium, having the leading end and the trailing end, against said platen roller means on a reverse delivery side with respect to said transfer position, and a second assistant roller means arranged for pressing said carrier and said cut recording medium, overlapped on said carrier, against said platen roller means on a forward delivery side with respect to said transfer position and for releasing the pressure of said carrier and said recording medium, so that the cut recording medium is moved between locations where its leading end and trailing end are at predetermined positions.

2. The heat sensitive transfer recording apparatus according to claim 1, wherein said carrier is wound around a pay-out reel at one side and is wound around a take-up reel at the other side passing between said thermal head and said platen roller means, said pay-out reel and said take-up reel including tensioning means for applying a constant tension to said carrier.

3. The heat sensitive transfer recording apparatus according to claim 1 or 2, wherein a plurality of color transfer materials are applied to regions of said carrier in predetermined order corresponding to a size of said recording medium.

4. In a heat sensitive transfer recording apparatus including a thermal head having heater elements each producing heat in response to an image signal, a drive control means for drivingly controlling said thermal head, a carrier to which is applied a thermal transfer material that may be heat transferred, and a platen roller means for delivering in a forward direction said carrier and a recording medium cut in a predetermined size, so as to have a leading end and a trailing end, and overlapped on said carrier, and for delivering only the recording medium in a reverse direction, wherein, upon delivering in the forward direction said carrier and said cut recording medium overlapped on said carrier, said thermal head is actuated, thereby transferring said thermal transfer material of said carrier to said recording medium at a transfer position, an improvement comprising a first assistant roller means arranged for pressing only said cut recording medium, having the leading end and trailing end, against said platen roller means on a reverse delivery side with respect to said transfer position, a second assistant roller means arranged for pressing said carrier and said cut recording medium, overlapped on said carrier, against said platen roller means in a forward delivery side with respect to said transfer position and releasing the pressure of said carrier and said recording medium, so that the cut recording medium is moved between locations where its leading end and trailing end are at predetermined positions, and a member pivotally mounted on said thermal head, said member being provided at a distal end thereof with said second assistant roller means.

5. The heat sensitive transfer recording apparatus according to claim 4, further comprising a spring means for pressing said second assistant roller means against said platen roller means, said spring means being interposed between said thermal head and said member provided its distal end with said second assistant roller means.

6. The heat sensitive transfer recording apparatus according to claim 4 or 5, wherein said carrier is wound around a pay-out reel at one side and is wound around a take-up reel at the other side passing between said thermal head and said platen roller means, said pay-out reel and said take-up reel including tensioning means for applying a constant tension to said carrier.

7. The heat sensitive transfer recording apparatus according to claim 4 or 5, wherein a plurality of color transfer materials are applied to regions of said carrier in predetermined order corresponding to a size of said recording medium.

8. The heat sensitive transfer recording apparatus according to claim 6, wherein a plurality of color transfer materials are applied to regions of said carrier in predetermined order corresponding to a size of said recording medium.

9. In a heat sensitive transfer recording method using a thermal head having heater elements each producing heat in response to an image signal, a drive control means for drivingly controlling said thermal head, a carrier to which is applied a thermal transfer material that may be heat transferred, and a platen roller means for delivering in a forward direction said carrier and a recording medium cut in a predetermined size, so as to have a leading end and a trailing end, and overlapped on said carrier, and for delivering only the recording medium in a reverse direction, wherein, upon delivering in the forward direction said carrier and said recording medium overlapped on said carrier, said thermal head is actuated, thereby transferring said thermal transfer material of said carrier to said recording medium at a transfer position, said method comprising the steps of: causing an image frame of the recording medium, cut in a constant size so as to have a leading end and a trailing end, to correspond to one color region of the carrier when color transfer materials of the carrier are overlap-transferred one by one in order; delivering said carrier and said cut recording medium, overlapped on said carrier, by a distance corresponding to a length of a first color region of said carrier in the forward direction by said platen roller means and a second assistant roller, provided on a forward delivery side with respect to said transfer position, while applying a pressure to said carrier and said cut recording medium by said thermal head; delivering, in the reverse direction upon the completion of the transfer recording of said first color, only the recording medium up to a position corresponding to a second color region of said carrier under a pressure release condition of said thermal head by a first assistant roller provided on a reverse delivery side of said transfer position, so that the cut recording medium is moved between locations where its leading end and trailing end are at predetermined positions; and starting a subsequent transfer operation.

* * * * *